United States Patent

[11] 3,630,307

[72] Inventors: Edwin C. Kamps
San Diego;
Irwin A. Glibbery, Chula Vista, both of Calif.; Billy G. Cook, Booneville, Ark.
[21] Appl. No.: 846,732
[22] Filed: Aug. 1, 1969
[45] Patented: Dec. 28, 1971
[73] Assignee: Rohr Corporation
San Diego, Calif.

[54] MECHANISM AND METHOD FOR MEASURING SOUND ABSORPTION
10 Claims, 5 Drawing Figs.

[52] U.S. Cl. ............................................ 181/.5
[51] Int. Cl. .......................................... G01v 1/06
[50] Field of Search ............................. 181/0.5 AP, .5

[56] References Cited
UNITED STATES PATENTS
3,327,806  6/1967  Anderson .................... 181/.5

Primary Examiner—Rodney D. Bennett, Jr.
Assistant Examiner—N. Moskowitz
Attorney—George E. Pearson ABSTRACT: An electromagnetic tone generator transmits a tone burst comprising sound waves of known wavelength and intensity into one end of a tube, the other end of which tube is fitted against the surface of a material which reflects the sound waves back along the interior of the tube with a reduction in intensity proportional to their loss of acoustical energy. A microphone is exposed interiorly of the tube at a known distance from each end of the tube. Electronic time delay and gate circuitry feed into a monitoring circuit the electrical oscillations from the microphone produced by a selected series of clear sound waves of the original and the reflected sound bursts for a comparison of amplitudes.

INVENTOR.
EDWIN C. KAMPS
IRWIN A. GLIBBERY
BILLY G. COOK
BY Edwin D. Grant
ATTORNEY 3,630,307

MECHANISM AND METHOD FOR MEASURING SOUND ABSORPTION

BACKGROUND OF THE INVENTION

In the past, when it has been required to determine the sound absorptive coefficient of a material, it has been customary to cut a sample of the material to be tested, and to test this sample, for example, by means of the reverberation chamber method, or by means of a standing wave tube, both of which are well-known laboratory test procedures. The reverberation chamber method, while having certain advantages, is involved and expensive. The standing wave tube is simpler than the reverberation chamber method, but still is far from simple; and in both of these prior art procedures a test sample of material must be provided which makes it impractical, if not impossible, to use either for the field testing of installed material. Such testing is most desirable in many instances, such as, for example, quality control, receiving inspection, and maintenance requirements, i.e., to determine the need for cleaning, repair or replacement.

All effective sound absorption materials have porous surfaces, and when they become dirty their sound absorption capabilities are impaired. Such being the case, assume, for example, that it is desired to test the sound absorption coefficient of a duct lining or other structure which is built into the cowling of an aircraft engine nacelle. To cut a sample from this material and carry it to a laboratory for testing by the reverberation chamber method or in a standing wave tube obviously would be impractical, and usually it would be cheaper and less destructive to simply clean the material than to conduct such test, even though the need for such cleaning might be in doubt.

SUMMARY OF THE INVENTION

It is a primary objective of this invention to provide a simple, compact, acoustical absorption test mechanism which is capable of being made portable; and more particularly to provide such a mechanism which can test installed acoustical absorption material in situ.

The foregoing objectives and advantages of the invention will be apparent from the following description and the accompanying drawings, wherein.

Figure 5:
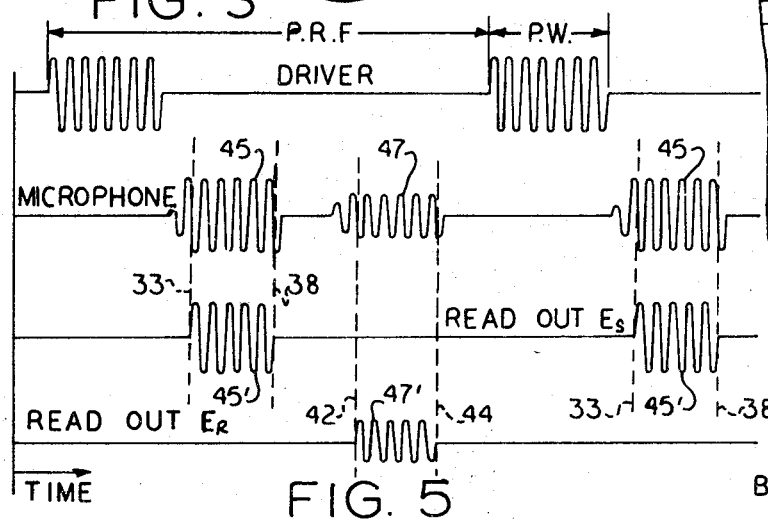

FIG. 5 is a time-amplitude diagram showing, on successive lines beginning at the top; (1) recurrent, shaped, electronic pulses which actuate the transmitter or acoustical driver, (2) electronic pulses transduced by the microphone from each tone burst and its reflected counterpart, (3) the portion selected for readout of each pulse transduced by the microphone from each original tone burst, and (4) the portion selected for readout of each pulse transduced by the microphone from the reflection of each tone burst.

DETAILED DESCRIPTION

Figure 1:
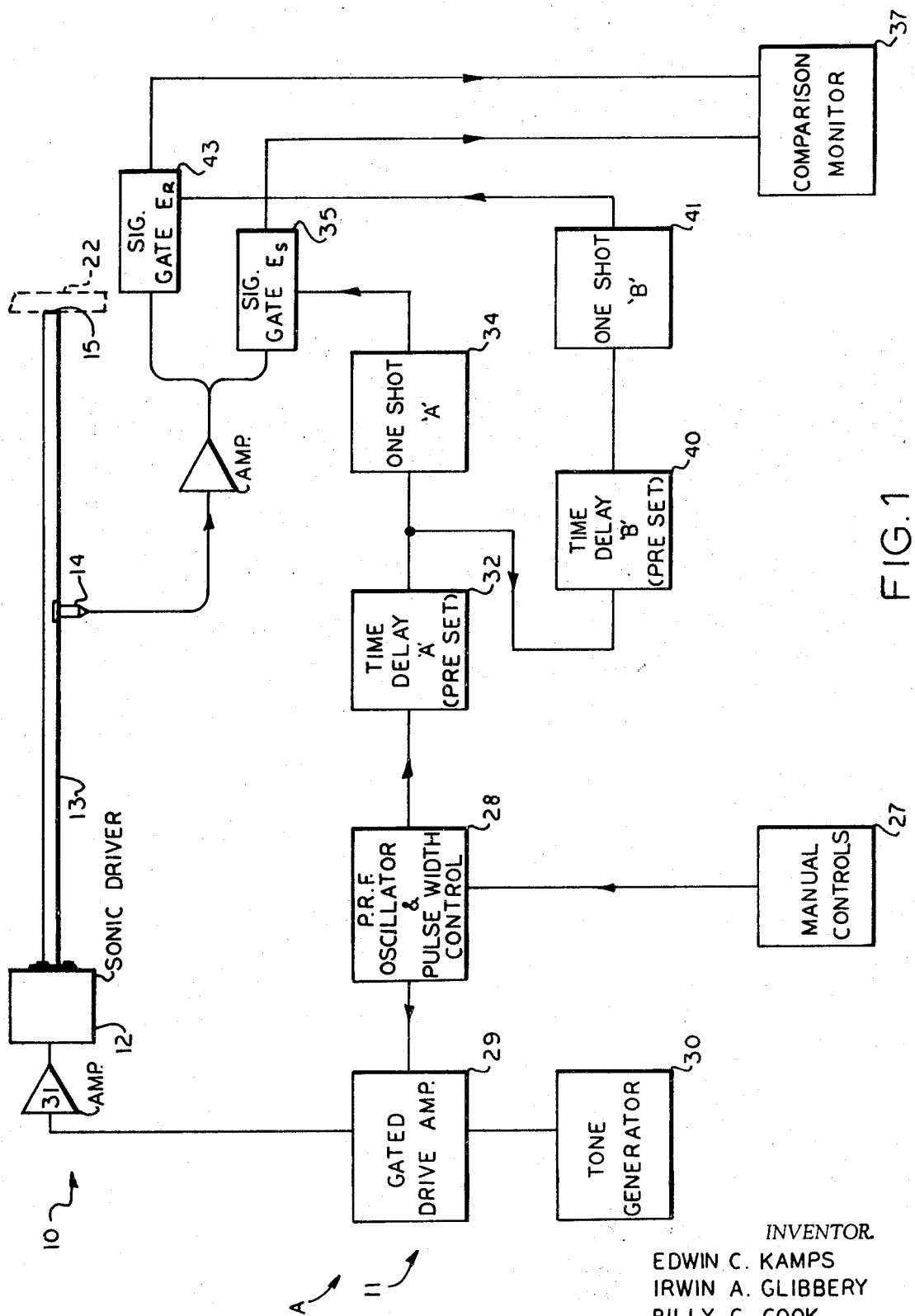
FIG. 1 is a diagrammatic, side elevational view of a mechanism embodying the invention and comprising a transmitter, tube and microphone assembly, together with a block circuit diagram of the electrical circuit elements.
Figure 2:
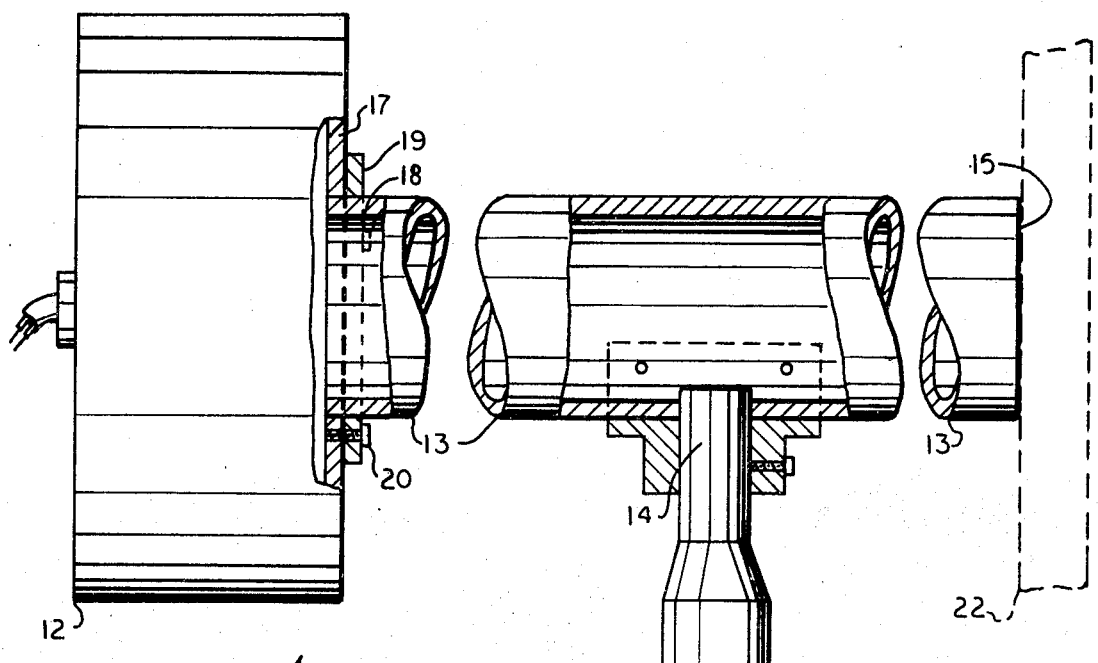
FIG. 2 is a fragmentary, enlarged view in side elevation of the principal portions of the transmitter, tube and microphone elements of the assembly of FIG. 1, a portion of the tone generator and tube being broken away, and the tube in the zone of he microphone being shown in diametrical section.

Referring to the drawings in detail, a sound absorption test mechanism A comprises a tone transmitting, reflecting and receiving assembly 10, FIGS. 1 and 2, which is electrically connected to a controlling and monitoring circuit 11, FIG. 1.

The assembly 10 comprises an acoustical transmitter 12 mounted to transmit recurrent tone bursts into one end of a smooth-bore tube 13 of known, uniform, internal diameter, and a microphone 14 mounted in a hole in a side of the tube 13 at a known distance from each end of the tube, the other end 15 of the tube being open and defining a plane substantially normal to the tube axis at said other end.

The illustrated transmitter 12 is a well-known type of electromagnetic transducer known as an acoustical driver, hereinafter referred to as such, with an acoustically insulated housing 17 having an outlet throat 18, see FIG. 2, of the same diameter as, and coaxial with, the bore of the tube 13. The transmitter is secured to the tube by means of a flange 19 and cap screws 20. The specific type of transmitter employed is not essential to the invention, but it should be capable of producing tone bursts of true tone and required intensity and frequency range.

It will be obvious to those familiar with acoustical testing that if the diameter of the throat 18 of the acoustical driver 12 is not the same as the internal diameter of the tube 13 to be used, a usual tapered or exponential horn will be employed to adapt the one to the other. Also, in the event that an acoustical driver or other transmitter is employed which does not have an acoustically insulated housing such as the instrument 12 shown in FIG. 2, it will be necessary to acoustically insulate the tube 13 from the actual sound-generating means employed so as to prevent the transmission to the tube of any vibrations likely to produce extraneous sound waves therein.

Figure 3:
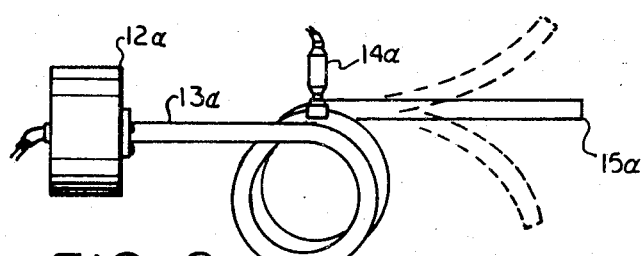
FIG. 3 is a somewhat diagrammatic, side elevation view in reduced scale of a modified form of the assembly shown in FIGS. 1 and 2, a flexible tube being substituted for the rigid one of the preceding views.

The tube 13 may be of any suitable material, such as, for example metal, plastic, or even rubber or rubberlike material. Soft copper tubing has been found suitable for this use, as has also a commercial vacuum cleaner hose of rubberlike material shown in FIGS. 3 and 4 and referred to later herein. The wall of the tube 13 should not be capable of resonating under the impulse of sound waves passing therethrough. It is important that the bore of the tube be uniform, particularly between the microphone 14 and the open end 15 of the tube, and that the internal diameter of the tube be less than one-fourth the wavelength of any sound waves to be employed in any test made with the invention.

There will be of course be some sound energy absorption by the tube itself, and in testing for the true sound absorption coefficient of a material this tube loss must be accurately determined and taken into consideration. However, in using the present invention it is contemplated that instead of comparing the reflected sound waves with their original counterparts, one reading will be taken using a known or "standard" sample of a material having a low sound absorption coefficient, such as a flat, polished steel plate, over the open end 15 of the tube. Another reading will be taken using the material to be tested, and a comparison will be made between the amplitude of the sound waves reflected by the steel plate and those reflected by the material to be tested. The original sound waves in both instances will be of the same frequency and sound pressure level.

The microphone 14 is of any suitable type, and preferably is mounted substantially flush with the interior of the tube wall. The distance between the microphone 14 and the open end 15 of the tube is sufficient to permit the readout of a required portion of the pulse transduced by the microphone from each original tone burst before any portion of the same tone burst has been reflected back to the microphone from a material 22 positioned across the end of the tube. Such separation between the original and reflected tone bursts is important, because the microphone transduces all sonic impulses which it receives, and in the event of an overlap at the microphone between the original and the reflected tone bursts, not clear, separate, and reliable reading of the relative amplitude of the two bursts could be obtained. Deletion from readout of the first few sound waves of each sound burst is desirable since it is well known that sound absorptive materials have a higher absorption capability with respect to the first few sound waves of a sonic impact, after which their reflective capability becomes stabilized.

A distance of 5 feet between the microphone 14 and the open end 15 of the tube has been found satisfactory, which provides for a total travel of 10 feet from the microphone to a material 22 positioned across the end of the tube and back to the microphone. Using a tube 13 of 1.62 inches I.D., with an input tone burst at a minimum of 800 Hz. (or c.p.s.) and at a sound pressure level of 120 db., this 5 foot distance permits the detention from readout of the first few sound waves of each tone burst and the readout of up to 20 subsequent clear cycles without overlap of the original and reflected tone bursts. The diagram shown in FIG. 5 obviously would be the result of using a distance shorter than 5 feet from the microphone to the material across the end of the tube, since there is barely time for the readout of five clear cycles before the return of the reflected tone burst.

In FIG. 5 the upright left-hand line represents a single point in time, the top transverse line indicates the recurrent pulses, consisting of shaped electrical impulses, which actuate the acoustical driver 12; the second line from the top represents the electronic pulses transduced by the microphone 13 from both the original tone burst and its reflected counterpart; the third line represents a clear portion of a pulse transduced from the original tone burst selected for readout; and the bottom line represents a clear portion of a pulse transduced from the reflected tone burst selected for readout.

The circuit 11 of FIG. 1 comprises circuit elements shown in boxes and labeled, all of which elements are of types well known to those familiar with sonar circuitry. Their details are, therefore, omitted. For producing a tone burst of desired frequency, sound pressure level, and duration, upon activation by an appropriate signal from a control panel 27, a Pulse Rate Frequency (P.R.F.) and Pulse Width Control circuit 28, see FIG. 5, actuates a Gated Drive Amplifier circuit 29 so that at controlled time intervals and for controlled periods of duration, a tone generator 30 is electrically connected through an amplifier 31 to acoustical driver 12. The tone generator 30 continuously generates electrical impulses defining a suitable wave shape for the operation of the acoustical driver 12 to cause the latter to provide sound waves at a desired frequency and capable of display, identification, and proportional measurement, while the amplifier 31 provides a desired sound pressure level.

Simultaneously with the energization of the Pulse Recurrence Frequency Oscillator and Pulse Width Control circuit 28, a preset Time Delay A circuit 32 is energized. The letter "A" in this connection refers to the original tone bursts, or $E_S$, while the letter "R" refers to the reflections thereof or $E_R$. This Time Delay A circuit 32 is preset for a delay sufficient to allow the first few sound waves of each original tone burst from the driver 12 to pass the microphone 14, and then, at the point in time indicated by the broken line 33 in FIG. 5, to energize, through a One Shot A circuit 34, a Signal Gate $E_S$ circuit 35 which communicates the microphone 14 with a readout monitor 37 for readout of the series of subsequent sinusoidal oscillations 45' transduced by the microphone 14 from the selected series of sound waves of the original tone burst, in this case five. The One Shot A circuit 34 cuts off the readout circuit from the microphone 14 to the monitor 37 at the point in time indicated by the broken line 38 in FIG. 5 just as the last of the selected series of sound waves of the original tone burst has passed the microphone.

Simultaneously with the energization of the One Shot A circuit 34 by the Time Delay A circuit 32, a Time Delay B circuit 40 is energized. This Time Delay B circuit 40 is preset to energize a One Shot B circuit 41 at the time, indicated by the broken line 42 in FIG. 5, that the reflected counterpart of the first of the same series of sound waves which were selected for readout from the original sound burst reaches the microphone. This energization of the One Shot B circuit 41 opens Signal Gate $E_R$ circuit 43 from the microphone to the monitor 37 for readout, and after a time period sufficient to allow readout of the reflected counterpart 47' of the same five waves, i.e., at the point indicated by the broken line 44 in FIG. 5, the One Shot B circuit 41 cuts off the Signal Gate circuit $E_R$ to end the readout for that particular tone burst and its reflection. This entire cycle is repeated at intervals controlled by the Pulse Rate Frequency Oscillator 28 as indicated on lines 1–3 of FIG. 5.

The difference in the amplitude between the readout of the selected electronic pulses ' of each original tone burst and those 47' of their reflected counterparts indicates the total amount of energy lost between the passage of the selected waves of each original tone burst past the microphone and the return of its reflected counterpart, which lose includes any absorption of energy by the tube. However, instead of making such comparison, as mentioned previously herein, it is proposed to compare the reflected sound waves from a material to be tested with those reflected from a known or standard sample of high sound reflectance.

Although the readout is described herein as being by means of a conventional oscilliscope in a well-known manner, it is contemplated that a direct readout circuit will be used as monitor, which will give a desired reading directly. However, such direct reading circuit is not a part of the present invention, it is not material to the use of the invention, and its inclusion would complicate the present specification. It is therefore omitted.

OPERATION

In operating the mechanism A of FIG. 1 the open end 15 of the tube 13 is placed flat against a material 22 to be tested, with the axis of the tube normal to the surface of the material 22. The controls 27 are then actuated manually to energize the acoustical driver 12 to produce successive tone bursts of required wavelength, sound pressure level, duration and recurrence frequency as explained previously herein, and the amplitude of the electronic pulses transduced by the microphone 14 from a selected series of original sound waves of each sound burst and their reflected counterparts are read out on the monitor 37.

The amplitude of the pulses transduced from the selected reflected sound waves as indicated by this test may be compared either with the amplitude of the pulses from their original counterparts, or with that of a similar series of sound waves reflected back from a selected standard sample of high acoustical reflectance, such as the steel plate referred to previously herein.

Figure 4:
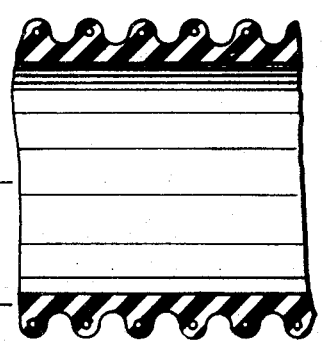
FIG. 4 is an enlarged, fragmentary, longitudinal, diametrical section view of a short fragment of a flexible tube which can be used with the form of the invention shown in FIG. 3.

Instead of the straight tube 13 shown in FIG. 1, a flexible tube 13a, see FIG. 4, may be substituted therefor. The use of a flexible tube instead of a straight, rigid tube permits a smaller package and the reaching into more inaccessible locations with the open end of the tube. The assembly 10a shown in FIG. 4 is, except for the flexiblity of the tube, the same as that 10 shown in FIGS. 1 and 2, and the same reference numerals are, therefore, employed to designate corresponding parts of the assembly 10a with the suffix "a" added thereto. The operation of the modification shown in FIG. 4 is similar to that described for the straight tube 10 of FIGS. 1 and 2.

The invention provides a simple, accurate, portable and relatively inexpensive mechanism for testing and sound absorption coefficient or condition of installed acoustic material in situ, even when installed in relatively inaccessible places.

Having thus described the invention, what is claimed as new and desired to by protected by United States Letters Patent is:

1. A mechanism for determining sound absorption properties of an acoustical material comprising:
    a tube of known minimum length and internal diameter,
    an acoustical transducer mounted on one end of the tube to transmit lengthwise into the tube a succession of tone bursts of known wavelength and sound pressure level, the other end of the tube being open and shaped to fit against a material to be tested with the tube axis at its open end normal to the material, whereby the material reflects back along the interior of the tube the tone burst transmitted by the acoustical transducer,
    a microphone exposed interiorly of the tube a selected distance from the open end of the tube, a readout monitor, and a circuit comprising circuit element elements controlling the duration and recurrence frequency of the tone bursts, and time delay and gate circuit elements constructed and arranged to communicate the microphone with the monitor for readout of the intensity of a pulse transduced by the microphone from a tone burst only during the passage of a selected series of sound waves of an original tone burst and the reflected counterparts of said selected series past the microphone.

2. A mechanism as claimed in claim 1 wherein the distance from the microphone to the open end of the tube is sufficient to permit readout of the selected series of sound waves from an original tone burst before of the first of the same selected series of sound waves are reflected back to the microphone by material positioned across the open end of the tube.

3. A mechanism as claimed in claim 1 wherein the internal diameter of the tube is not greater than one-fourth the wavelength of the sound waves of an original tone burst transmitted.

4. A mechanism as claimed in claim 1 wherein the duration of an original sound burst is not greater than the time required for the selected portion thereof to travel between the microphone and the open end of the tube.

5. A mechanism as claimed in claim 1 wherein at least a portion of the tube is flexible.

6. A mechanism as claimed in claim 1 wherein the actuation of the time delay and gate circuit elements is initiated concurrently with the initiation of each tone burst.

7. A mechanism as claimed in claim 1 wherein at least a portion of the tube is coiled.

8. A mechanism as claimed in claim 1 wherein the tube is resiliently flexible.

9. The method of determining sound absorption properties of an acoustic material which comprises projecting a tone burst of known wavelength, sound pressure level, and duration through air or other gas along a restricted path past a microphone exposed in said path, and toward a sample of material having undetermined sound absorption properties positioned across said path a known distance beyond the microphone and normal to said path for reflecting said tone burst back along the same path, measuring the amplitude of a selected portion of the pulse transduced by the microphone from the original tone burst, measuring also the amplitude of the pulse transduced by the microphone from the reflection by said material of the same selected portion of said pulse, and comparing the amplitude of the selection portions of the pulse transduced by the microphone from the original and the reflected portions thereof.

10. The method of determining sound absorption properties of an acoustic material which comprises projecting a tone burst of known wavelength, sound pressure level, and duration into one end of a tube, past a microphone exposed interiorly of the tube toward a material positioned a known distance beyond the microphone and normal to the axis of the tube at the other end of the tube for reflecting said sound burst back along the interior of the tube, measuring the amplitude of a selected portion of the pulse transduced by the microphone from the original tone burst, and measuring also the amplitude of the pulse transduced by the microphone from the reflection by said material of the same selected portion of said pulse.

* * * * *